United States Patent
Misonou et al.

(10) Patent No.: US 6,830,791 B1
(45) Date of Patent: Dec. 14, 2004

(54) GLASS PANEL

(75) Inventors: Masao Misonou, Muko (JP); Hidemi Katoh, Itami (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/529,887

(22) PCT Filed: Sep. 8, 1999

(86) PCT No.: PCT/JP99/04893

§ 371 (c)(1),
(2), (4) Date: Apr. 20, 2000

(87) PCT Pub. No.: WO00/15938

PCT Pub. Date: Mar. 23, 2000

(30) Foreign Application Priority Data

Sep. 14, 1998 (JP) .............................. 10-260382

(51) Int. Cl.[7] .................... B32B 15/04; B32B 17/06; E06B 3/24; E06B 3/26

(52) U.S. Cl. .................... 428/34; 428/426; 428/428; 428/432; 428/433; 428/434; 428/450; 428/457; 428/472; 428/469; 52/204.5; 52/204.591; 52/204.593; 52/204.6; 52/479; 52/786.1

(58) Field of Search .................... 428/34, 426, 432, 428/433, 434, 469, 472, 492.1

(56) References Cited

U.S. PATENT DOCUMENTS

| | | | | |
|---|---|---|---|---|
| 4,035,608 A | * | 7/1977 | Stromquist et al. | 219/218 |
| 4,456,335 A | * | 6/1984 | Mumford | 350/331 |
| 4,610,771 A | | 9/1986 | Gillery | |
| 4,683,154 A | * | 7/1987 | Benson et al. | 428/34 |
| 4,698,891 A | * | 10/1987 | Borys | 29/417 |
| 4,786,344 A | * | 11/1988 | Beuther | 156/109 |
| 5,395,698 A | | 3/1995 | Neuman et al. | |
| 5,520,996 A | * | 5/1996 | Balian et al. | 428/216 |
| 5,677,065 A | * | 10/1997 | Chaussade et al. | 428/432 |

FOREIGN PATENT DOCUMENTS

| | | | |
|---|---|---|---|
| DE | 3228364 | * | 2/1984 |
| JP | 2745255 | | 9/1997 |
| JP | 1087350 | | 4/1998 |
| JP | 10-120447 | | 5/1998 |
| JP | 10-167766 | | 6/1998 |
| WO | 94/24398 | | 10/1994 |

* cited by examiner

Primary Examiner—Vivian Chen
(74) Attorney, Agent, or Firm—Fulbright & Jaworski L.L.P.

(57) ABSTRACT

In a glass panel includes at least three glass sheets for forming an air layer (K) and a vacuum layer (S) side by side and for partitioning between outdoor space and indoor space, at least either an outdoor-side glass sheet contacting the outdoor space or an indoor-side glass sheet contacting the indoor space of the glass sheets (G) contacts the vacuum layer (S) and includes a low-emittance film layer (M) formed on a face thereof contacting the vacuum layer (S).

5 Claims, 4 Drawing Sheets

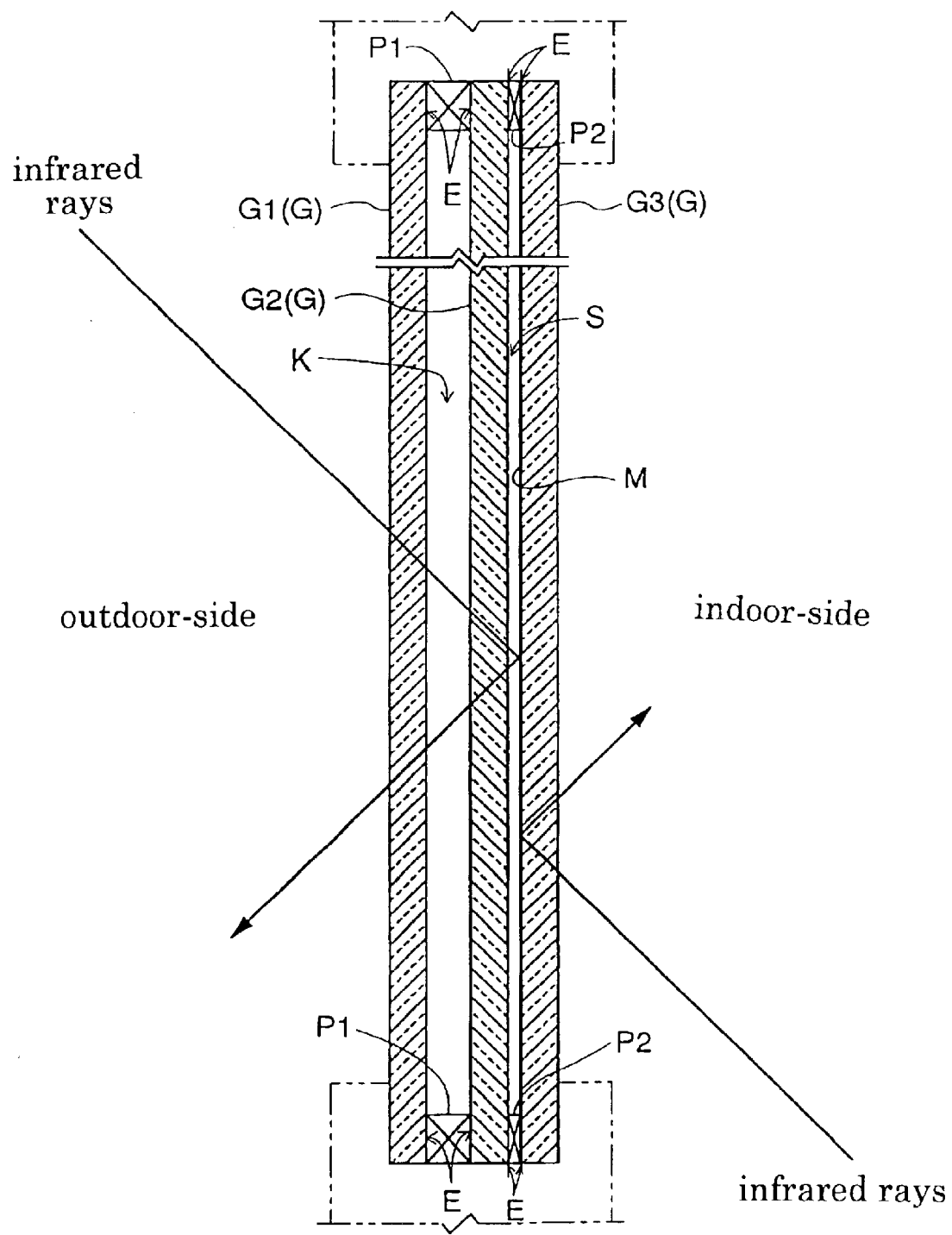

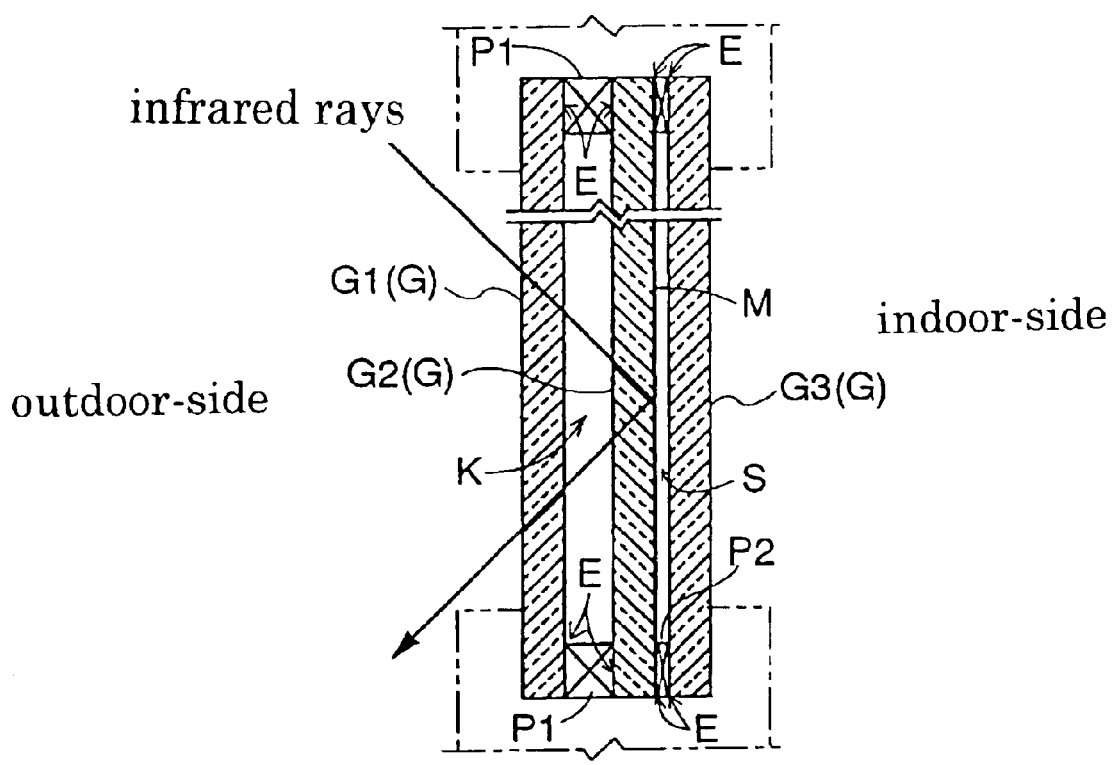
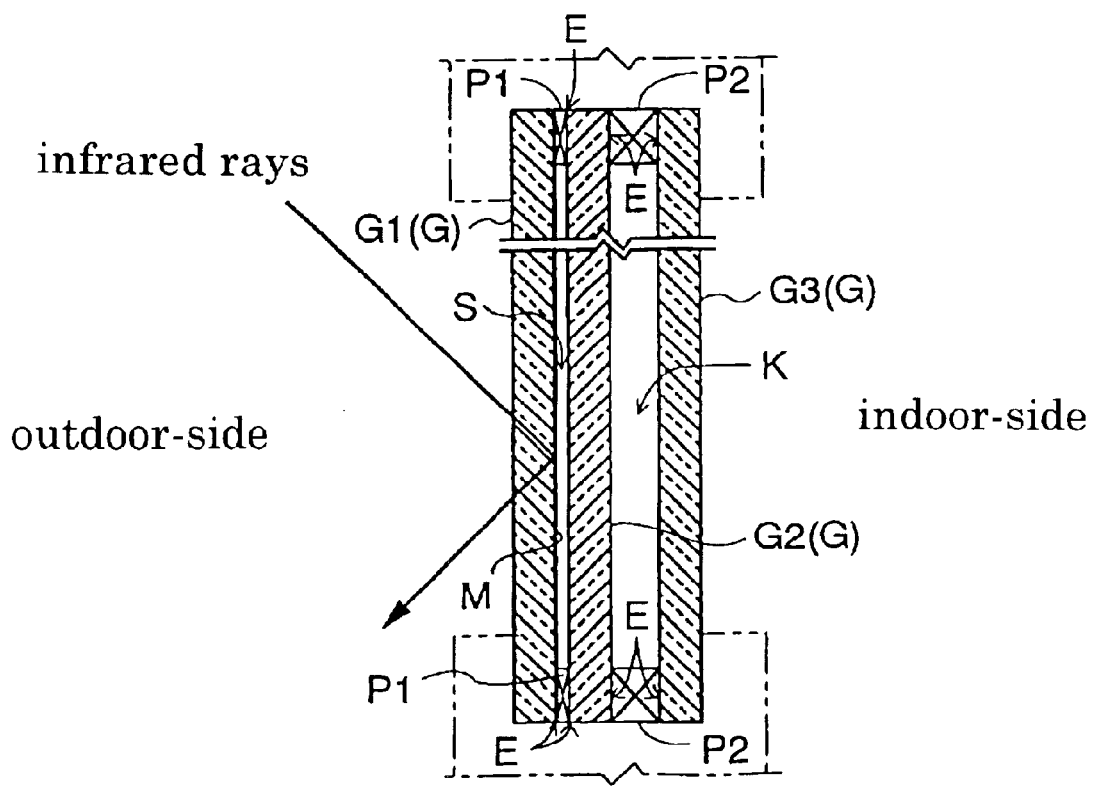

GLASS PANEL

TECHNICAL FIELD

The present invention relates to a glass panel including at least three glass sheets for forming an air layer and a vacuum layer side by side and for partitioning between outdoor space and indoor space.

BACKGROUND ART

There is known a glass panel of the above-noted type which includes e.g. three glass sheets, with a vacuum layer being formed between the center glass sheet and one side glass sheet and an air layer being formed between the center glass sheet and the other side glass sheet, so as to provide a low thermal transmittance.

With the above-described conventional glass panel, the glass panel may achieve such low thermal transmittance and a high heat insulation because of the effects of the air layer and vacuum layer.

However, with this conventional glass panel, since the glass has high emittance, if such glass panel is employed in a window pane of an ordinary building, during winter season, the warm heat of the indoor space can be conducted in the form of infrared ray through the three glass sheets to be diffused to the outdoor space.

Here, the term: "emittance" is defined as the ratio of the heat re-radiated from the glass sheet relative to the total amount of heat irradiated on the glass sheet in case the heat is radiated from the glass sheet which was warmed by heat rays back to the outside.

The object of the present invention is to overcome the above-described drawback of the prior art by providing a glass panel having high heat insulation and capable of shielding heat rays such as infrared ray.

DISCLOSURE OF THE INVENTION

A multilayered glass panel, according to claim 1, is characterized in that at least either an outdoor-side glass sheet contacting the outdoor space or an indoor-side glass sheet contacting the indoor space of glass sheets G contacts the vacuum layer S and includes a low-emittance film layer M formed on a face thereof contacting the vacuum layer S.

If at least either an outdoor-side glass sheet contacting the outdoor space or an indoor-side glass sheet contacting the indoor space of glass sheets G contacts the vacuum layer S and includes a low-emittance film layer M formed on a face thereof contacting the vacuum layer S, as proposed by the present invention, this low-emittance film layer may reflect the infrared rays. So that, in addition to the heat insulating effects of the air layer and the vacuum layer, it is also possible to restrict heat diffusion from the indoor space which is being heated to the outdoor space. Therefore, the heat insulating effect may be further improved.

And, the glass panel of the present invention has the function of preventing heating of the glass sheets per se. That is, while the low-emittance film layer can effectively reflect far infrared radiation while the same layer can absorb near infrared radiation more readily than a glass sheet having no such low-emittance film layer. Therefore, when subjected to the sunbeam, the glass sheet with the low-emittance film layer is heated to a high temperature more easily than a glass sheet without such layer.

Suppose now the glass sheet with the low-emittance film layer comprises the center glass sheet of the glass panel.

Then, once this glass sheet is heated due to the sunbeam, the heat will not be conducted to either space as both the space on the one side of the glass sheet and that on the other side of the same are heat-insulated, so that this glass sheet alone will be heated to high temperature. As a result, there will develop an excessive temperature difference between this glass sheet and the other glass sheet opposing thereto via the vacuum space, and consequently there may be developed a significant warp in the glass sheet which warp may even destroy this glass sheet.

On the other hand, in the case of the glass panel according to the present invention, the low-emittance film layer is provided on either the outdoor-side glass sheet contacting the outdoor space or the indoor-side glass sheet contacting the indoor space. Hence, when the temperature of the glass sheet with the low-emittance film layer begins to rise, the heat of this glass sheet may be readily diffused into the air of the outdoor space or the indoor space. Therefore, the above-described problem may be avoided.

Incidentally, according to the spirit of the present invention, it is only required that at least either one glass sheet, i.e. the outdoor-side glass sheet or the indoor-side glass sheet contact the vacuum layer and include the low-emittance film layer. That is, as long as either one glass sheet has the above feature of the invention, the construction of the other glass may vary as desired. For instance, it may be freely selected whether the other glass sheet too is provided with such low-emittance film layer or not, or whether this further low-emittance film layer if provided contacts the vacuum layer or the air layer.

According to a glass panel relating to claim 2, the low-emittance film layer M comprises a thin film containing, as the main component thereof, stannic oxide mixed with fluorine.

The above-described low-emittance film layer may be obtained for example by spraying an organic compound of tin, in the form of vapor, such as tin tetrachloride ($SnCl_4$), dimethyl tin dichloride ($(CH_3)_2SnCl_2$), or the like on to the surface of the glass sheet which is heated to e.g. 500 to 700° C., with a carrier gas of e.g. nitrogen gas. In his, the thermal emittance may be further reduced if fluorine is added in the film.

With the above-illustrated method, there may be obtained a fluorine-containing stannic oxide film which has a thickness of e.g. about 0.2 to 1.0 $\mu$m (2000–10000 angstrom) and which is transparent and electroconductive. In this case, the conductive electrons within the film provide the function of reflecting the infrared rays, so that the resultant glass panel obtains even superior heat insulating performance with the emittance ranging between 0.20 and 0.15 approximately.

Further, according to a glass panel relating to claim 3, the low-emittance film layer M comprises a thin film including at least one set of composite layer consisting of a silver layer and a pair of transparent dielectric layers opposed to each other across the silver layer.

If the low-emittance film layer is comprised of at least one set of composite layer consisting of a silver layer and a pair of transparent dielectric layers opposed to each other across the silver layer as described above, this thin film may effectively reflect the infrared rays in the sunbeam so as to further reduce the amount of infrared rays transmitted to the indoor space.

Silver has good electroconductivity so as to effectively reflect the infrared layers. However, with silver alone, its reflectance of visible light is high and also transparency required for a windowpane cannot be obtained. Therefore, if this silver layer is sandwiched between a pair of transparent dielectric layers of $TiO_2$, $ZnO$, $SnO_2$ or the like to restrict reflection of visible light, there may be obtained a multilayered film which is transparent and which yet reflects the infrared rays. The low-emittance film layer M obtained in the manner described above has a reflectance of about 0.10 to 0.05, thus achieving high heat insulating performance.

Further, by superposing more than two such composite layers, the reflectance of the low-emittance film layer M may be even reduced. For instance, if two sets of such composite layers are provided, the reflectance becomes 0.02 to 0.05. Then, there may be obtained a low-emittance film layer M having even superior heat insulating effect to the case where only one such composite layer is provided.

Incidentally, although reference marks are provided in the foregoing for facilitating reference to the accompanying drawings, it is understood that the provision of these marks is not to limit the construction of the present invention to those shown in these accompanying drawings.

BRIEF DESCRIPTION OF THE DRAWINGS

FIG. 1 is an explanatory view illustrating generally a glass panel relating to one embodiment of the present invention, FIG. 2 is an explanatory view illustrating the effect of the glass panel relating to the present invention, FIG. 3 is an explanatory view illustrating a glass panel relating to one embodiment of the present invention.

BEST MODE FOR EMBODYING THE INVENTION

Figure 4:
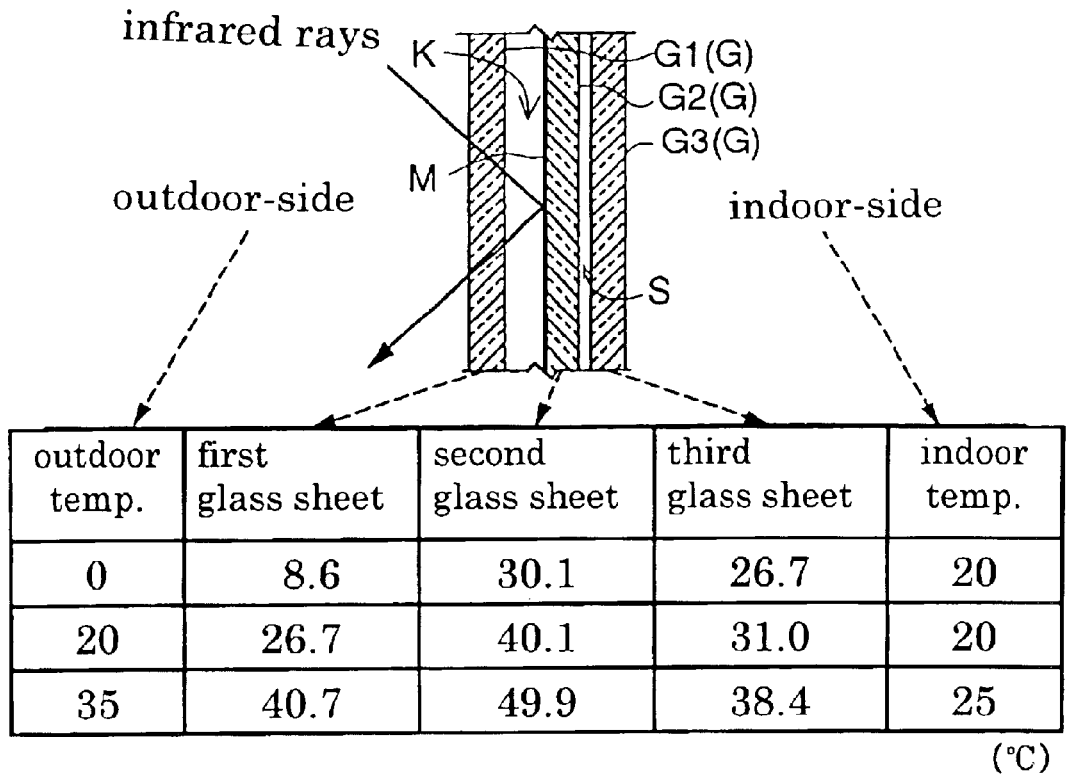
FIG. 4 is an explanatory view relating to the results of experiments of temperature rise in the glass panel relating to the present invention.

Next, embodiments of the present invention will be described with reference to the accompanying drawings. In the drawings, those portions denoted with identical marks to the convention represent their identical or corresponding portions.

(Summary)

FIG. 1 shows the construction of a glass panel relating to the present invention.

This glass panel is used as e.g. a windowpane for partitioning between the outdoor space and the indoor space. This glass panel is formed of e.g. three glass sheets G, which sheets G form an air layer K and a vacuum layer S therebetween and also a low-emittance film layer M is formed on a face of the glass sheet G, so as to achieve good heat insulating performance.

(Construction of the Glass Panel)

As shown in FIG. 1, the three glass sheets G constituting the glass panel are referred individually to as the first glass sheet G1, the second glass sheet G2 and the third glass sheet G3 according to the order from the one disposed on the side of the outdoor space. Namely, in the instant embodiment, the outdoor-side glass sheet recited in the claims is the first glass sheet G1 and the indoor-side glass sheet is the third glass sheet G3, respectively.

The thickness of the respective glass sheets G1–G3 may be freely set. Generally, the thickness may be about 3 mm, for example.

In the instant embodiment, an air layer K is formed between the first glass sheet G1 and the second glass sheet G2 and a vacuum layer S is formed between the second glass sheet G2 and the third glass sheet G3. The air layer K is formed by providing a sealing member P1 between a peripheral edge E of the first glass sheet G1 and a peripheral edge E of the second glass sheet G2 and charging dessicant into the inner space so as to seal dry air therein. With provision of this air layer K, the heat insulating performance, sound insulating performance, etc. may be enhanced.

On the other hand, the vacuum layer S is formed by setting the pressure in the space sandwiched between the second glass sheet G2 and the third glass sheet G3 below $10^{-2}$ Torr. Such vacuum layer S achieves distinguished heat insulating performance and sound insulating performance. Moreover, these effects are sufficient even with a space narrower than the air layer K. As a whole, the glass panel may be formed thin.

Such vacuum layer S may be formed for example by first reducing the air pressure in the space between the second glass sheet G2 and the third glass sheet G3, and then, under this condition, fusing the peripheral edge E of the second glass sheet G2 and the peripheral edge E of the third glass sheet G3 with low-melting glass P2 or the like.

(Low-Emittance Film Layer)

With the glass panel according to the present invention, a low-emittance film layer M is formed on the outermost glass sheet G contacting either the outdoor space or the indoor face and contacting also the vacuum layer S.

This low-emittance film layer M may be obtained for example by spraying an organic compound of tin, in the form of vapor, such as tin tetrachloride ($SnCl_4$), dimethyl tin dichloride ($(CH_3)_2SnCl_2$), or the like on to the face of the glass sheet which is heated to e.g. 500 to 700° C., with a carrier gas of e.g. nitrogen gas. Alternatively, such film layer may be obtained also by pressurizing the tin organic compound together with pressurized air containing organic solvent dissolved therein into mist to be sprayed. In this case, if fluorine is added in the film, the reflectance may be further reduced. For this, compound of e.g. hydrogen fluoride (HF), trifluoroacetic acid ($CF_3COOH$), or the like is mixed into the mist of the tin compound to be sprayed together.

The resultant film of the fluorine-containing tin oxide preferably has a film thickness ranging from 0.2 to 1.0 $\mu m$ (2000–10000 angstrom) approximately. Then, this film is rendered into a transparent and electroconductive film, so that the conductive electrons within the film reflect the infrared rays to render the reflectance of the glass sheet into 0.20 to 0.15 approximately.

The low-emittance film layer M is formed on one of the faces of the third glass sheet G3 which face contacts the vacuum layer S, that is, the one face which does not contact the outdoor space or the indoor space. Referring to the reason for this construction, if the low-emittance film layer M were formed on the face contacting the outdoor space or the indoor space, this low-emittance film layer M would be peeled off due to contact with a foreign object or the glossiness of the surface of the glass sheet G would be lost, so that the original property of glass such as reflecting light and allowing entrance of the image of landscape, would be lost.

According to the glass panel of the present invention, it is essential that the low-emittance film layer M be formed on a glass sheet G which contacts the vacuum layer S and which also contacts the outdoor or indoor space, not on a glass sheet which contacts the vacuum layer S but which does not contact the outdoor or indoor space.

First, referring to the reason why the low-emittance film layer M is formed on the glass sheet contacting the vacuum layer S, this is because heat is conducted generally with greater difficulty through vacuum layer S than through the air layer K, so that the effect of the low-emittance film layer M for restricting infrared heat conduction is greater with the vacuum layer S than with the air layer K. More specifically, supposing: Rk is the heat resistance of the air layer K; Rs is the heat resistance of the vacuum layer S; Cn is the readiness of infrared ray heat transmission (heat conductance) between conventional glass sheets; and Ce is the heat conductance between glass sheets with the low-emittance film layer M formed on one of them; the heat conductance C1 in case the low-emittance film layer M is present in the air layer K is obtained by the following equation:

$$C1=1/(1/(1/Rk+Ce)+1/(1/Rs+Cn))$$

And, the heat conductance C2 in case the low-emittance film layer M is present in the vacuum layer S is obtained by the following equation.

$$C2=1/(1/(1/Rk+Cn)+1/(1/Rs+Ce))$$

From the two equations above, the difference may be expressed as:

$$C1-C2 \propto (Ce-Cn) \cdot (Rk-Rs)$$

And, with Rs>>Rk and Cn>>Ce; then, it maybe said: C2<C1.

Secondly, referring to the reason why the low-emittance film layer M is formed on the glass sheet G which contacts the outdoor space or indoor space, this is because the following problem will occur if the low-emittance film layer M is formed on a glass sheet which contacts the vacuum layer S but which does not contact the outdoor space or the indoor space.

As shown in FIG. 2, let us know suppose the low-emittance film layer M is formed on the one of the two faces of the second glass sheet G2 which one face contacts the vacuum layer S. In this case, there occurs the problem that the temperature of the second glass sheet G2 rises and it is deformed by a large amount. This is due to the property of the low-emittance film layer M which absorbs the near infrared ray to a certain degree while it reflects the far infrared ray well. Namely, the conductive electrons easily absorb the near infrared rays having the wavelength of 1 to 2 $\mu$m. As this near infrared ray amounts to about 50% of the solar energy impinged on the earth, such glass sheet absorbs the sunrays more readily than e.g. a soda-lime float glass sheet without such film layer, so that significant temperature rise occurs in such glass sheet during sunshine.

For this reason, once the second glass sheet G2 is heated, it is difficult for the heat of this second glass sheet G2 to be conducted to the air layer K which is already at a high temperature, so that the amount of heat conducted to the third glass sheet G3 through the vacuum layer S on the opposite side will be even smaller. Hence, the second glass sheet G2 alone will be heated to a high temperature and a large amount of deformation will occur therein. The amount of this deformation will be even more pronounced in summer season. In a worst case, as the deformation amount becomes excessive relative to the first glass sheet G1 or third glass sheet G3, it may lead to fissure in the sealing member P1 forming the air layer K or even breakage of the second glass sheet G2 or third glass sheet G3.

However, as shown in FIG. 1, if the low-emittance film layer M is formed on the third glass sheet G3 which contacts the vacuum layer S, in the summer season for example, when the third glass sheet G3 is heated by the near infrared ray absorbed in the low-emittance film layer M, this retained heat will be discharged to the indoor space. Hence, the temperature of the third glass sheet G3 will not be elevated so much. And, as the vacuum layer S is present between this glass sheet and the second glass sheet G2, the second glass sheet G2 will not be heated and no excessive thermal deformation will occur in this second glass sheet G2.

Accordingly, the construction of the present invention is capable of restricting heat transfer from the outdoor space to the indoor space and capable also of restricting incidence of infrared ray without any particular inconvenience.

Incidentally, during nighttime in the winter season too, the glass panel of the present invention achieves good infrared shielding effect. Namely, during nighttime, the far infrared ray irradiated from e.g. a piece of furniture in a room will tend to be transmitted from the third glass sheet G3 toward the first glass sheet G1. In such case, however, since the low-emittance film layer M is formed on the third glass sheet G contacting the indoor space, the far infrared ray will be transmitted through the third glass sheet G3 only and then be reflected back into the indoor space. Further, the far infrared ray will not be absorbed by e.g. the second glass sheet G2. Consequently, it is possible to restrict drop of the temperature of the indoor space.

In the foregoing embodiment, the vacuum layer is provided on the side of the indoor space. Instead, as shown in FIG. 3, the vacuum layer S may be provided on the first glass sheet G1 contacting the outdoor space. In this case, the flow of heat from the indoor space to the outdoor space is substantially the same as that shown in FIG. 1.

(Effect)

As described above, with the glass panel of the present invention in which the low-emittance film layer M is formed on a glass sheet contacting the outdoor space or indoor space and on its inner face contacting the vacuum layer S, there has been provided a glass panel which achieves good heat-ray shielding effect by minimizing heat transfer and transmission of infrared ray between the outdoor space and the indoor space and which also has less possibility of e.g. breakage due to overheating.

[Embodiment]

As described hereinbefore, the low-emittance film layer M relating to the present invention may be obtained by spraying an organic compound of tin, in the form of vapor, such as tin tetrachloride ($SnCl_4$), dimethyl tin dichloride (($CH_3)_2SnCl_2$), as well as monomethyl tin trichloride ($CH_3SnCl_3$), monobutyl tin trichloride ($C_4H_9SnCl_3$), or the like on to the face of the glass sheet which is heated. In this spraying operation, if fluorine compound such as hydrogen fluoride (HF), trifluoroacetic acid ($CF_3COOH$), fron gas, etc is added appropriately, even higher infrared-ray reflecting effect may be obtained. Preferably, the film has thickness of 0.2 to 1.0 $\mu$m (2000–10000 angstrom). The resultant glass sheet G provides reflectance of 0.20 to 0.15 approximately.

Further, this low-emittance film layer M may be obtained by means of sputtering also. In this case, for example, on the face of the glass sheet G, an oxide layer of tin oxide, zinc oxide or the like is formed as a first layer. On this, a silver and a same oxide layer as the one above as a second layer are superposed. In this case, the first layer is formed in the thickness of 0.01 to 0.05 $\mu$m (100–500 angstrom), the silver layer is formed in the thickness of 0.005 to 0.02 cm (50–200 angstrom), and the second oxide layer is formed in the thickness of 0.01 to 0.05 μm (100–500 angstrom), approximately. The low-emittance film layer M thus obtained provided reflectance of 0.10 to 0.05.

With the glass panel according to the present invention, as described above, the low-emittance film layer M is formed on a glass sheet which forms the outer side and which also contacts the vacuum layer S. The reason for use of such construction will be apparent from the results of experiments to be described next.

FIGS. 4 through 7 show the results of experiments of temperature elevation of glass panels using a glass sheet G formed with a low-emittance film layer M comprised of tin tetrachloride.

Figure 5:
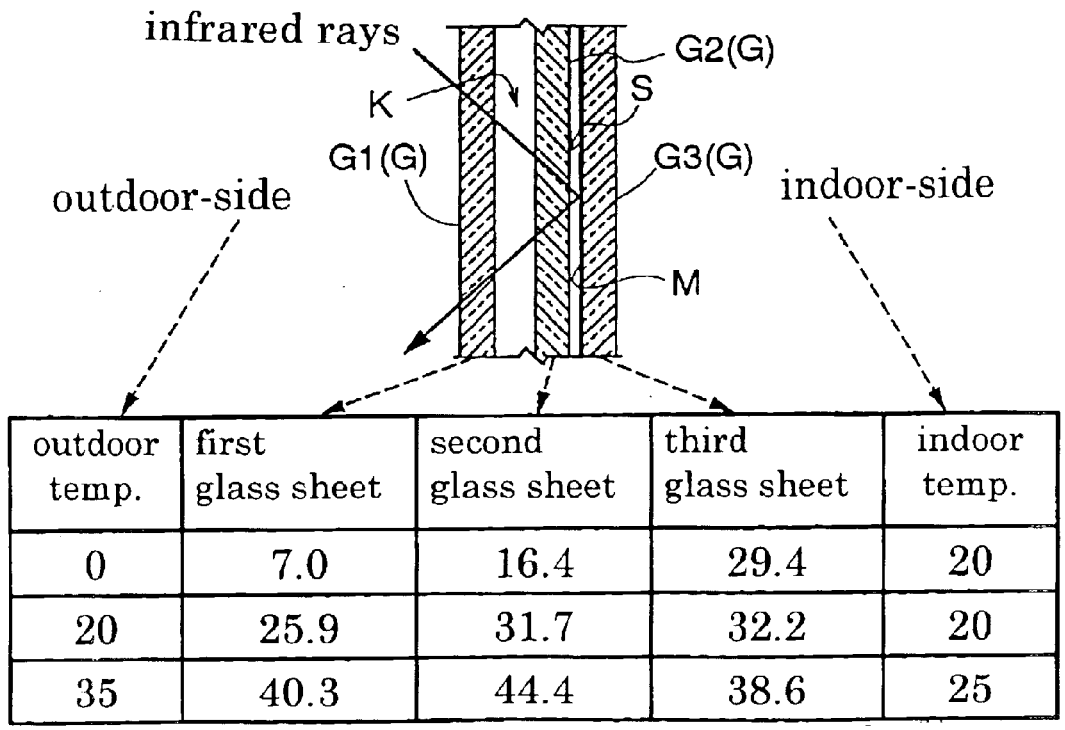
FIG. 5 is an explanatory view relating to the results of experiments of temperature rise in the glass panel relating to the present invention.

FIGS. 4 and 5 show the result of a case when the air layer K was disposed on the side of the outdoor space while the vacuum layer S was disposed on the side of the indoor space. FIG. 4 shows a case in which the low-emittance film layer M was formed on one of the faces of the second glass sheet G2 which is on the side of the heat source. FIG. 5 shows another case in which the low-emittance film layer M was formed on the inner face of the third glass sheet G3 contacting the vacuum layer S. That is, FIG. 5 shows a glass panel according to the present invention, whereas FIG. 4 shows a glass panel for comparison.

Comparing the results of FIG. 4 and FIG. 5, no significant differences are seen in the temperature of the first glass sheet G1 and the temperature of the third glass sheet G3. However, in either case of FIG. 4 and FIG. 5, the temperatures of these first and third glass sheets G1, G3 were higher to certain degrees as compared with the temperature of the outdoor space and that of the indoor space, respectively, since they absorbed some of the infrared ray contained in the sunbeam. Yet, although the first glass sheet G1 and the third glass sheet G3 were heated in themselves, the heat obtained by them was gradually discharged into the outdoor space or the indoor space. Therefore, the temperatures of the first glass sheet G1 id and the third glass sheet G3 rose not higher than 40° C. approximately.

On the other hand, as for the temperature of the second glass sheet G2, the degrees of heating were greatly different, depending on the position where the low-emittance film layer M was formed. The heating degree of the second glass sheet G2 was especially large in the case of the low-emittance film layer M being formed on the second glass sheet G2. This is due to the characteristics of the low-emittance film layer M and the heat insulation of the glass panel. That is, the low-emittance film layer M has the characteristics that it reflects the far infrared ray well, but absorbs the near infrared ray to a certain extent. For this reason, the amount of heat absorbed by a glass sheet G with the low-emittance film layer M is greater than the amount of heat absorbed by a glass sheet G without such low-emittance film layer M. And, in the case of the low-emittance film layer M being formed on the second glass sheet G2, as this second glass sheet G2 is bound between the dry heat-insulating air layer K and the vacuum layer S, there is no place for this absorbed heat to escape, so that the second glass sheet G2 is heated to an even higher temperature.

For example, in the case of FIG. 4, the temperature of the second glass sheet G2 rose as high as 49.9° C. Whereas, in the case of FIG. 5, the temperature rose only to 44.4° C. This demonstrates that forming the low-emittance film layer M on the third glass sheet G3 provided higher effect of restricting overheating of the second glass sheet G2.

As described above, in the case of the glass panel of FIG. 4 as the comparison example, the thermal expansion of the second glass sheet G2 was greater than those of the first glass sheet G1 and the third glass sheet G3, so that there was the possibility of breakage of any of the glass sheets G. On the other hand, in the case of the glass panel of FIG. 5 relating to the present invention, the possibility of such breakage was less.

Incidentally, the results of experiment when the low-emittance film layer M was formed on the first glass sheet G1 were not discussed above. In this case, however, a portion of the amount of heat obtained by the first glass sheet G1 due to absorption of infrared rays will heat the air layer K and also this heated air layer K in turn will heat the second glass sheet G2. Therefore, it may be assumed that the second glass sheet G2 will be heated up to a temperature between the case of FIG. 4 and the case of FIG. 5.

Figure 6:
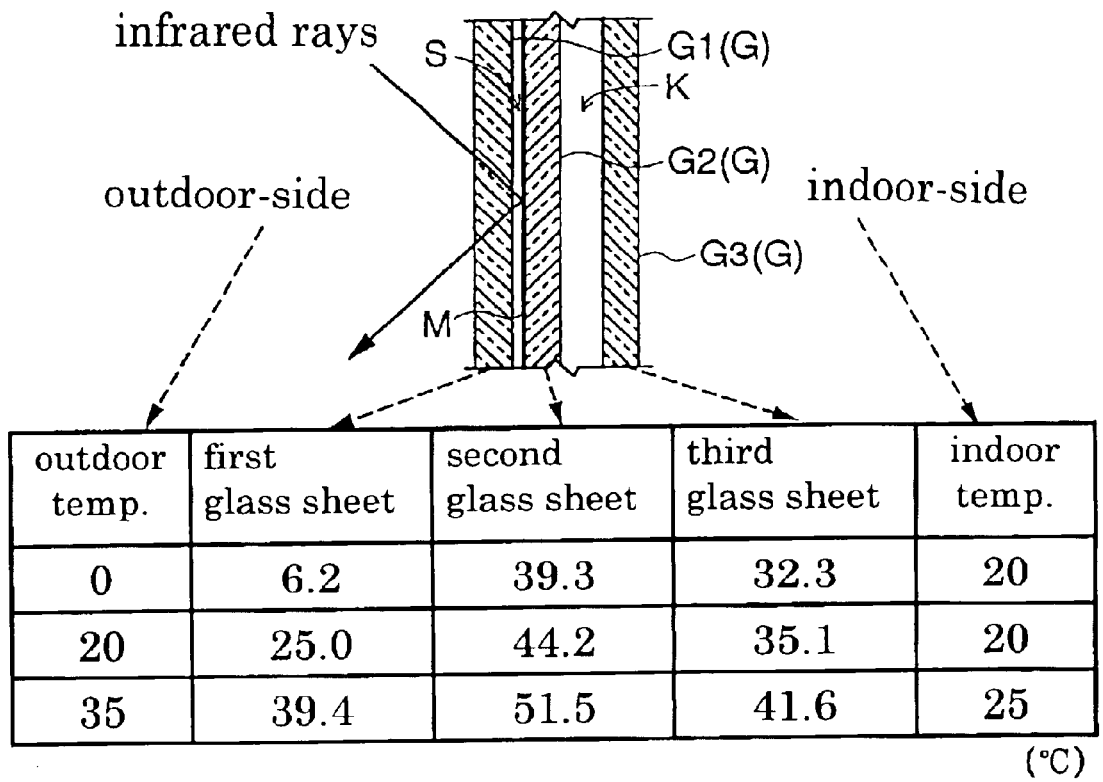
FIG. 6 is an explanatory view relating to the results of experiments of temperature rise in the glass panel relating to the present invention.
Figure 7:
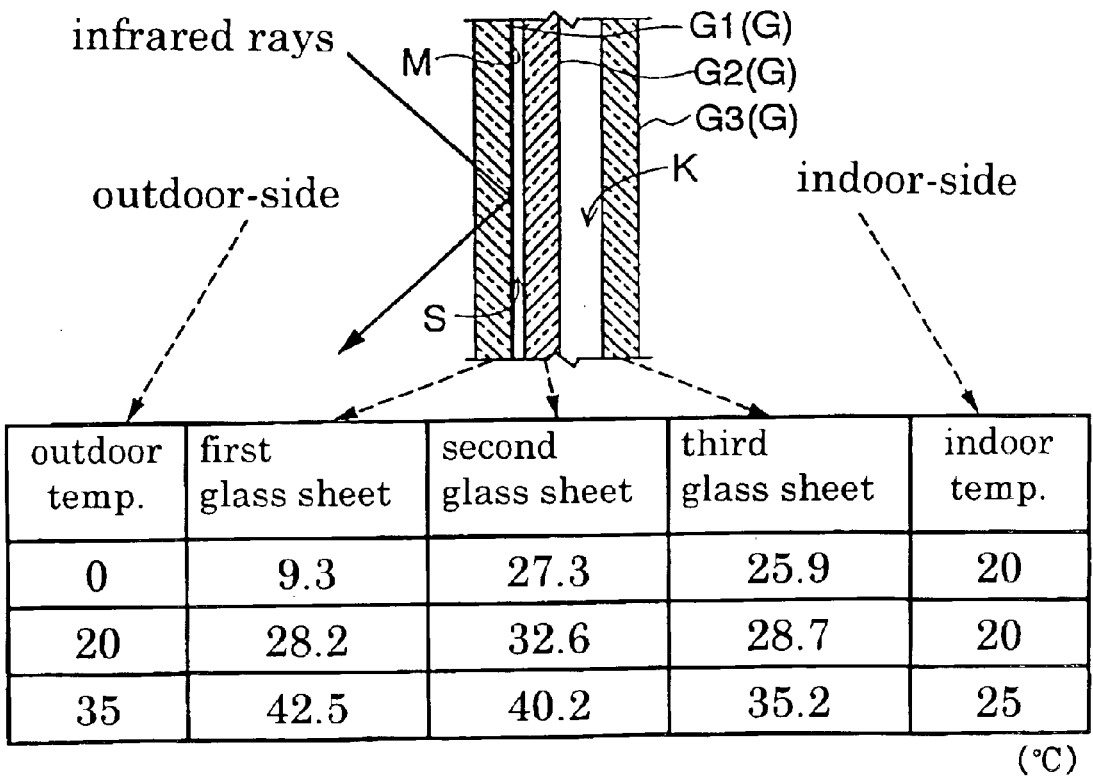
FIG. 7 is an explanatory view relating to the results of experiments of temperature rise in the glass panel relating to the present invention.

FIGS. 6 and 7 show the results of experiments in which the vacuum layer S was provided on the side of the outdoor space and the air layer K was provided on the side of the indoor space. In this, FIG. 7 shows a glass panel according to the present invention; and FIG. 6 shows a glass panel as a comparison example.

FIG. 6 relating to the comparison example illustrates the case in which the low-emittance film layer M was formed on the one of the two faces of the second glass sheet G2 which one face is on the side of the heat source.

FIG. 7 relating to the present invention illustrates the case in which the low-emittance film layer M was formed on the inner face of the first glass sheet G1 which face contacts the vacuum layer S.

In this case again, comparing the results of FIG. 6 and FIG. 7, there is observed no significant difference in the temperature of the first glass sheet G1 between the cases of FIG. 6 and FIG. 7. However, the temperature of the third glass sheet G3 relating to FIG. 6 is slightly higher than the temperature of the third glass sheet G3 relating to FIG. 7. This is because the low-emittance film layer M is formed on the second glass sheet G2 in the case of FIG. 6, so that the air layer K contacting the third glass sheet G3 was heated to a higher temperature.

As for the temperature of the second glass sheet G2, this temperature rose up to 51.5° C. in the case of FIG. 6 in which the low-emittance film layer M was formed on this second glass sheet G2. Whereas, in the case of FIG. 7, the temperature rose not higher than 40.2° C. That is to say, in case the low-emittance film layer M is formed on the first glass sheet G1 contacting the vacuum layer S, like the cases relating to FIGS. 4 and 5, the temperature elevation of the second glass sheet G2 is restricted. Hence, it may be understood that the possibility of breakage of the second is reduced for the glass panel of FIG. 7 relating to the present invention.

Incidentally, in this case too, the results of experiment in which the low-emittance film layer M was formed on the third glass sheet G3 were not discussed. However, it may be assumed that with such construction a result in the middle of the cases of FIGS. 6 and 7 will be obtained.

As may be apparent from the above-described results shown in FIGS. 4 through 7, in the cases of the glass panels relating to FIG. 5 and FIG. 7 in which the low-emittance film layer M is formed on the inner face of a glass sheet G contacting the outdoor space or indoor space, temperature elevation of the second glass sheet G2 may be effectively restricted, so that it is possible to avoid such problem as breakage of this second glass sheet G2.

[Other Embodiments]

(1) In the foregoing embodiment, the low-emittance film layer M is provided only on the third glass sheet G3 which contacts the vacuum layer S on the side of the indoor space.

In addition to this, another low-emittance film layer M may be formed also on the first glass sheet G1 contacting the outdoor space.

In this manner, if the low-emittance film layers M are provided to both the third glass sheet G3 contacting the indoor space and the first glass sheet G1 contacting the outdoor space, whether high temperature exists on the side of the indoor space or the outdoor space, the low-emittance film layer M is always present on the glass sheet G contacting such high-temperature space. As a result, the infrared rays from the high-temperature space may be reflected without being allowed to enter the inside of the glass panel, so that the amount of infrared beam absorbed by the glass sheet G disposed inside the panel may be reduced advantageously. And, the infrared ray which has entered the inside of the glass panel without being reflected by the glass sheet on the side of the high-temperature space will be prevented from being transmitted again by the low-emittance film layer M on the opposite glass sheet G.

Therefore, with the glass panel according to this further embodiment, the heat transfer and transmission of infrared ray between the outdoor space and the indoor space may be restricted even more reliably, so that extremely good heat-ray shielding effect may be achieved.

(2) In the foregoing embodiment, the low-emittance film layer M is provided s a thin film composed mainly of tin oxide mixed with fluorine. The invention is not limited thereto. Instead, the low-emittance film layer M may comprise at least one set of composite layer consisting of a silver layer and a pair of transparent dielectric layers opposed to each other across the silver layer.

Silver as it is has high reflectance for the visible rays, so that the transparency essential for a windowpane cannot be obtained. Accordingly, by sandwiching silver with a pair of opposed transparent dielectric layers such as of $TiO_2$, $ZnO$, $SnO_2$ or the like so as to restrict reflection of visible rays from the opposed sides of the silver layer, there may be obtained a multilayered film which is transparent and which reflects the infrared rays. As such multilayered layer requires strict control of the thickness of each layer, this will be produced generally by the physical vapor deposition method or industrially by the sputtering method which allows processing over a large area.

In order for the above-described silver layer to obtain good transparency, the film thickness of this silver layer becomes an important parameter. Specifically, the silver layer will be formed in the thickness of 0.005 to 0.02 $\mu$m (50–200 angstrom).

On the other hand, the film thickness of the transparent dielectric layers sandwiching the silver layer therebetween may be optimized, depending on the refractive index, For instance, it will be set within the range of 0.01 to 0.05 $\mu$m (100–500 angstrom).

The low-emittance film layer M obtained in the manner described above provides reflectance of 0.10 to 0.05 approximately, which is super to the reflectance of the tin oxide film layer described hereinbefore. However, the silver layer can be readily deteriorated through coagulation due to e.g. moisture in the air, so as to deteriorate its outer appearance and reflectance, Therefore, special care should be taken in its handling such as its storage.

The low-emittance film layer M may comprise two or more sets of such composite layers for even superior characteristics. In such case, the film thickness of each film constituting the respective composite layer needs to be controlled even more strictly than the construction including only one set of composite layer. The construction including two sets of composite layers superposed each other provides reflectance of about 0.02 to 0.05, so that there may be obtained a low-emittance film layer M having even superior heat insulating performance.

However, the conductive electrons within the silver layer easily absorb the near infrared rays having the wavelength of 1 to 2 $\mu$m. As this near infrared ray amounts to about 50% of the solar energy impinged on the earth, such glass sheet absorbs the sunrays more readily than e.g. a soda-lime float glass sheet without such film layer, so that significant temperature rise occurs in such glass sheet during sunshine.

(3) The air layer K is charged usually with dry air. Instead, such gas as argon, krypton, or the like may be charged therein. As the convection of such rare gas hardly occurs within the air layer K, heat transmission between the two glass sheets G may be restricted to achieve higher heat insulating effect.

Further, if such gas is charged, it becomes possible to prevent more reliably dew condensation inside the air layer K so that the glass surface may be kept clean for an extended period of time.

(4) The glass sheet G is not limited to the glass sheet G described in the foregoing embodiments having the thickness of 3 mm. It may be a glass sheet G having a different thickness.

Further, the type of glass sheet G may be freely determined as desired. For instance, it may be figured glass, frosted glass (glass provided, through a surface treatment thereof, with the function of diffusing light), wired glass, tempered glass, glass sheet provided with the function of heat absorption, ultraviolet absorption, heat reflection or the like, or any combinations of these.

(5) Further, as for the composition of the glass, it may be sodium silicate glass (soda lime silica glass), boric silicate glass, aluminosilicate glass, or various kinds of crystallized glass.

<3>The glass panel of the present invention may comprise combination of glass sheets G having a same length, width or the like, or may comprise combination of glass sheets G having different lengths, widths or the like. And, the superposing manner of the glass sheets G may alternatively be such that the peripheral edges thereof are superposed in alignment with each other or not in alignment with each other.

Further, the glass panel P may be constructed by assembling one particular glass sheet G and another glass sheet which differs in the thickness thereof.

(7) The glass panel relating to the present invention is not limited to the one formed of flat glass sheets G. It may be formed of glass sheets having curved faces. For instance, if such panel is employed for a front glass of an automobile, glass window in front of an operator's cabin of a railway train or skylight of a passenger's coach, etc. it will provide not only the sound insulating and heat insulating performances, but also defrosting performance, so as to provide good view for greater safety of driving.

INDUSTRIAL APPLICABILITY

The glass panel relating to the present invention may be used for a variety of applications. For example, it may be used for buildings, vehicles (windowpane of automobile, windowpane of railway cars, windowpane of ship), instrument components (surface glass of a plasma display, door or wall of a refrigerator, door or wall of a heat reserving device).

What is claimed is:

1. A glass panel comprising at least three glass sheets for forming an air layer and a vacuum layer side by side and for partitioning between outdoor space and indoor space;

wherein at least either an outdoor-side glass sheet contacting the outdoor space or an indoor-side glass sheet contacting the indoor space of the glass sheets contacts the vacuum layers and includes a low-emittance film layer formed only on the vacuum contacting face of said outdoor-side glass sheet or said indoor-side glass sheet, said low-emittance film layer being an electro-conductive film and having a reflectance of at least one of the ranges selected from the group consisting of a) 0.2 and 0.15 and b) 0.10 and 0.02 by conductive electrons within the film reflecting infrared rays and wherein said air layer is formed by charging dessicant into an inner space thereof.

2. The glass panel according to claim 1, wherein the low-emittance film layer comprises a thin film containing, as the main component thereof, stannic oxide mixed with fluorine.

3. The glass panel according to claim 1, wherein the low-emittance film layer comprises a thin film including at least one set of composite layer consisting of a silver layer and a pair of transparent dielectric layers opposed to each other across the silver layer.

4. A glass panel consisting essentially of:

at least three glass sheets for forming an air layer and a vacuum layer side by side and for partitioning between outdoor space and indoor space;

wherein either an outdoor-side glass sheet contacting the outdoor space or an indoor-side glass sheet contacting the indoor space of the glass sheets contacts the vacuum layer, and includes a low-emittance film layer formed only on the vacuum contacting face of one of said outdoor-side glass sheet or said indoor-side glass sheet, said low-emittance film layer being an electro-conductive film and having a reflectance of at least one of the ranges selected from the group consisting of a) 0.2 and 0.15 and b) 0.10 and 0.02 by conductive electrons within the film reflecting infrared rays and wherein said air layer is formed by charging dessicant into an inner space thereof.

5. A glass panel consisting of:

three glass sheets for forming an air layer and a vacuum layer side by side and for partitioning between outdoor space and indoor space;

wherein either an outdoor-side glass sheet contacting the outdoor space or an indoor-side glass sheet contacting the indoor space of the glass sheets contacts the vacuum layers and includes a low-emittance film layer formed only on the vacuum contacting face thereof of one of said outdoor-side glass sheet or said indoor-side glass sheet, said low-emittance film layer being an electroconductive film and having a reflectance of at least one of the ranges selected from the group consisting of a) 0.2 and 0.15 and b) 0.10 and 0.02 by conductive electrons within the film reflecting infrared rays and wherein said air layer is formed by charging dessicant into an inner space thereof.

* * * * *